United States Patent [19]

Scarlett et al.

[11] 4,365,789
[45] Dec. 28, 1982

[54] APPARATUS FOR THE DIRECT REDUCTION OF IRON IN A SHAFT FURNACE USING GAS FROM COAL

[75] Inventors: John C. Scarlett, Toledo, Ohio; Charles W. Sanzenbacher, Charlotte, N.C.

[73] Assignee: Midrex Corporation, Charlotte, N.C.

[21] Appl. No.: 308,700

[22] Filed: Oct. 5, 1981

Related U.S. Application Data

[62] Division of Ser. No. 187,024, Sep. 15, 1980, Pat. No. 4,331,470.

[51] Int. Cl.³ .............................................. F27B 1/28
[52] U.S. Cl. ...................................... 266/87; 266/156; 266/157
[58] Field of Search .......................... 266/156, 157, 87

[56] References Cited

U.S. PATENT DOCUMENTS

| | | | |
|---|---|---|---|
| 4,017,305 | 4/1977 | Waslo | 75/35 |
| 4,046,555 | 9/1977 | Lange | 75/35 |
| 4,201,571 | 5/1980 | Scarlett et al. | 75/35 |

*Primary Examiner*—M. J. Andrews
*Attorney, Agent, or Firm*—Ralph H. Dougherty

[57] ABSTRACT

A method and apparatus for the direct reduction of iron in a shaft furnace using gas from the gasification of solid fossil fuel, such as coal, in which the fuel gas is desulfurized and upgraded in the shaft furnace and direct reduction of iron oxide is carried out in the same furnace. Clean export fuel can be produced by this method along with direct reduced iron. The apparatus includes means for controlling the temperature of the process gas entering the furnace.

3 Claims, 1 Drawing Figure

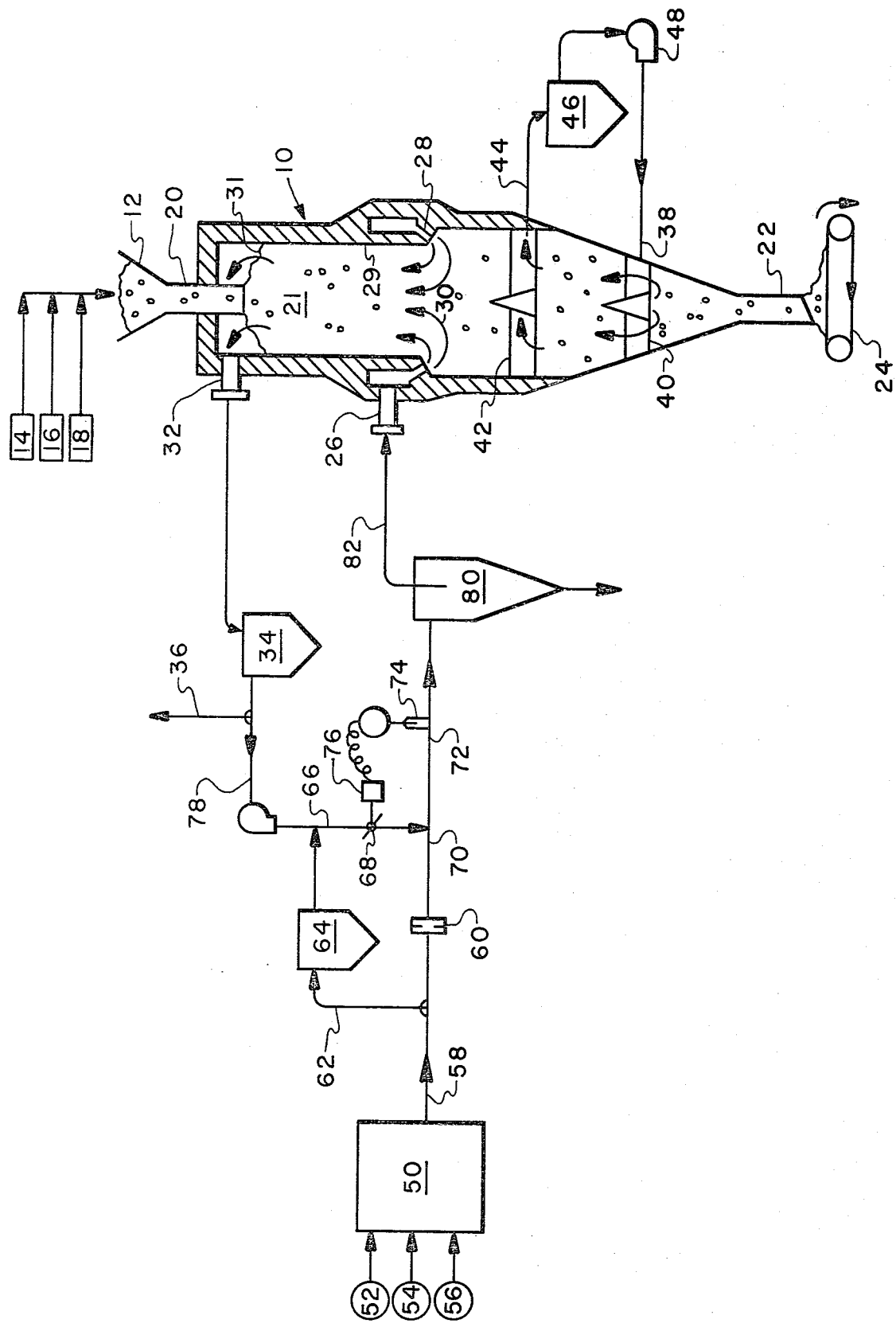

APPARATUS FOR THE DIRECT REDUCTION OF IRON IN A SHAFT FURNACE USING GAS FROM COAL

This is a division of application Ser. No. 187,024, filed Sept. 15, 1980 now U.S. Pat. No. 4,331,470.

BACKGROUND OF THE INVENTION

The direct reduction of iron oxide, in forms such as pellets or lump ore, to metallic iron in the solid state has become a commercial reality throughout the world in recent years. The combined annual capacity of direct reduction plants currently in operation or under construction is in excess of 15 million metric tons of direct reduced iron product, which is used primarily for feedstock in electric arc steelmaking furnaces. The world demand for additional direct reduced iron is projected to increase at a substantial rate for many years to satisfy a growing world need for such feedstock, as additional electric arc furnace steelmaking plants are constructed.

The majority of the plants producing direct reduced iron utilize natural gas as the source of reductant. The natural gas is reformed to produce the reductants CO and $H_2$. A few plants utilize coal as the source of reductant in rotary kiln processes, such as the SL/RN process, which directly react coal in situ in the kiln without separately gasifying the coal to CO and $H_2$. The rotary kiln processes have an inherent coal utilization inefficiency in that approximately two-thirds of the coal is burned in the kiln to supply heat and only one-third is used to supply the reducing gas for direct reduction. This inefficiency results in a coal requirement of 5.0 to 6.0 Gcals (Gigacalories) per metric ton of direct reduced iron produced. This is in contrast to 3.0 to 3.5 Gcals of natural gas required per metric ton of direct reduced iron produced in the more efficient natural gas processes, such as the Midrex, Purofer or Armco process.

There are many processes, not yet commercialized, which gasify coal by partial oxidation with oxygen and steam to produce a gas which is then utilized in different manners in the direct reduction of iron. The principal reasons none of these processes has been commercialized are either that such processes are too complex or impractical for commercialization, or the coal requirements are too high. The basic problem which causes an impractical process or a high total coal requirement is that the hot gas issuing from the coal gasifier is too low in reductants (CO plus $H_2$) relative to oxidants ($CO_2$ plus $H_2O$ vapor) to be directly utilized efficiently in the direct reduction of iron.

In the present invention, the hot gas produced by the coal gasifier is upgraded in reductants relative to oxidants within the reduction furnace by reaction with carbon and is also desulfurized by reaction with lime to produce a gas which can be utilized efficiently in the direct reduction of iron, since the upgrading, desulfurizing and direct reduction processes are carried out in the same shaft. The spent reducing gas from the reduction furnace is cooled and scrubbed of dust, then becomes a source of clean, low-sulfur fuel gas to be utilized elsewhere. This combination of direct reduction of iron with fuel gas production has particular utility in an integrated steel plant which currently employs natural gas as fuel gas to supplement coke oven gas for reheating and heat treating operations. The direct reduced iron may be used as feed for basic oxygen steelmaking, or as part of the burden in a blast furnace to increase its hot metal output, or as feed for an electric arc furnace. The fuel gas produced can replace all or part of the natural gas currently used as fuel in the steel plant.

The present invention requires approximately 6.1 Gcals of coal to be gasified plus 0.6 Gcal of carbon for reaction in the furnace plus 0.8 Gcal of coal to produce electricity for gasification oxygen, to produce one metric ton of direct reduced iron while producing 3.6 Gcals of clean fuel gas. The Gcals consumed in producing one metric ton of direct reduced iron are therefore approximately 3.9, as shown in Table IV. It should be noted that only 80% of the carbon added to the furnace charge is reacted and the excess carbon is discharged with the direct reduced iron. This excess carbon can be magnetically separated from the direct reduced iron and recycled to further reduce the energy consumption of the process.

OJBECTS OF THE INVENTION

It is the primary object of this invention to provide a practical and thermally efficient process for utilizing coal as the source of gaseous reductant in the direct reduction of iron.

It is also an object of this invention to provide an efficient method of directly utilizing hot gas from a coal gasifier in the direct reduction of iron by upgrading the reducing potential of the gasifier gas by reaction with carbon in the same shaft in which the direct reduction of iron occurs.

It is another object of the invention to provide a method for desulfurizing hot gas for a coal gasifier by reaction with a sulfur acceptor such as lime in the same shaft in which the direct reduction of iron occurs.

It is a further object of the invention to produce simultaneously direct reduced iron and clean fuel gas from coal.

It is also an object of this invention to provide apparatus for producing direct reduced iron and clean fuel gas from coal.

BRIEF DESCRIPTION OF THE DRAWING

The single FIGURE is a diagrammatic illustration of the preferred embodiment of the present invention.

DETAILED DESCRIPTION

A refractory lined counterflow shaft type direct reduction furnace 10 has a feed hopper 12 mounted at the top thereof. Iron oxide 14 in the form of oxide pellets and/or natural lump ore, carbon (coke) 16, and limestone 18 of a nominal particle size in the range of 5 to 30 mm, are fed into the feed hopper. The feed materials descend into the furnace through a feed pipe 20 to establish a burden 21 within the furnace. Reduced iron pellet and/or lump product, unreacted carbon, calcium sulfide, and unreacted limestone or lime are withdrawn from the lower region of the furnace through a furnace discharge pipe 22 by a discharge conveyor 24, the speed of which controls the rate of descent of the burden 21 through furnace 10.

Fresh hot reducing gas is introduced to furnace 10 through a hot reducing gas inlet pipe 26 and then through a plurality of gas inlet ports 28 arranged in refractory wall 29 in the middle region of the furnace. The hot reducing gas flows inwardly, then upwardly in counterflow relationship to the descending burden as indicated by gas flow arrows 30. $CO_2$-rich spent reducing gas exits the burden 21 near the top of the furnace at stockline 31 formed by the angle of repose of the feed from the oxide feed pipe 20. The $CO_2$-rich spent reducing gas, hereinafter called top gas exits the furnace through an offtake pipe 32.

Top gas leaving furnace 10 through offtake pipe 32 is cooled and scrubbed of dust in a cooler-scrubber 34 and is removed from the system as clean export fuel gas product through pipe 36.

The lower region of furnace 10 is provided with a cooling gas recirculating circuit for cooling the reduced iron prior to discharge. This cooling circuit includes a cooling gas inlet 38 connected to a cooling gas distributing member 40 within furnace 10, a cooling gas collecting member 42 positioned above the distributing member within the furnace, a cooling gas outlet 44, and an external gas recirculating system consisting of a cooler-scrubber 46, a recirculating blower 48 and associated conduits.

A fossil fuel gasifier 50 has associated oxygen injector 52, steam injector 54 and fossil fuel injector 56. Oxygen or oxygen and steam are admitted through the injectors to gasify fossil fuel such as coal, lignite or char within gasifier 50, in order to produce a hot gasifier gas which leaves the gasifier through pipe 58. Residual ash from the gasification of the fuel is withdrawn from the gasifier 50 through an ash discharge, not shown.

The major portion of the hot gasifier gas in pipe 58 is passed through a hot orifice 60 which creates a resistance to flow and forces a minor portion of hot gas through by-pass line 62 and cooler 64. Cooled gas then flows through pipe 66 and control valve 68 prior to mixing with hot gas in pipe 70. The temperature of the mixed gasifier gas in pipe 72 is measured by thermocouple 74 which is connected to controller 76 which controls the positioning of valve 68. Optionally, part or all of the cooled spent top gas (export gas) can be recycled through line 78 as tempering gas. The tempered gasifier gas contains solidified particles from the gasifier which are removed in cyclone 80 and discharged from the bottom of cyclone 80. The dedusted tempered gas is discharged from the cyclone through pipe 82 to the reduction furnace reducing gas inlet 26.

The counterflow shaft furnace is recognized as the most efficient means to produce direct reduced iron. In such furnaces, the hot reducing gas serves to heat the incoming cold iron oxide feed to reducing temperature and also furnish the reductants (CO plus $H_2$) required to chemically reduce iron oxide to metallic iron. Commercial operating experience with natural gas based plants has shown that in order to take full advantage of the chemical efficiency of a counterflow shaft reduction furnace, the reducing potential of the hot gas or its quality, which is defined as the ratio of reductants (CO plus $H_2$) to oxidants ($CO_2$ plus $H_2O$), should be at least about 8.

In the gasification of pulverized solid fossil fuels such as coal or lignite in a partial oxidation type gasifier such as gasifier 50, which produces a hot gasifier gas containing principally CO, $H_2$, $CO_2$ and $H_2O$, the highest quality hot gas that has been achieved commercially is in the range of about 3 to 4. However, process development and demonstration coal gasifiers are now being constructed which have a goal of producing a better quality hot gas of at least about 6 through improved gasification technology.

The advent of such improved gasifiers has resulted in the invention of fluid bed unit and shaft unit gas upgrading processes which utilize the high temperature of raw gas from the gasifier to furnish the heat required to further upgrade its quality by endothermically reacting carbon with the oxidants in the hot raw gas. These upgrading devices are separate fluid bed or shaft devices which are located between the gasifier and direct reduction furnace. The present invention accomplishes gas quality upgrading in the same shaft in which direct reduction is accomplished, thus eliminating the need for additional costly and complicated equipment.

Prior to the present time, it was considered impractical to react carbon (coke) at temperatures below about 950° C. because the rate of reaction is slow at lower temperatures. Therefore, it was necessary to carry out upgrading reactions at temperatures between about 1350° C. (gasifier effluent temperature) and 950° C. and then temper the upgraded gas to temperatures below about 815° C. for use in a direct reduction furnace. We have now determined in our laboratory that carbon will react with $H_2O$ and $CO_2$ at a practical rate at temperatures as low as 750° C. if the reaction is allowed to occur over a relatively long period of time. Furthermore, we have learned that hot gasifier gas can be introduced into a direct reduction shaft at temperatures exceeding 950° C. without causing the metallized particles in the burden to become sticky, providing carbon is present in the burden to react endothermically. In essence, carbon will react to cool the furnace burden. A well designed direct reduction shaft furnace will provide a minimum of 6 hours solids residence time and commensurately long gas residence time in order to carry out direct reduction reactions. Even longer residence times can be provided readily and inexpensively by increasing furnace volume. Such long residence times make practical the reaction of carbon at the normal operating temperatures used in shaft direct reduction operations, which are 750°-900° C. The present invention, therefore, offers substantial cost savings over previous technology.

The following description of the operation of the present invention is based on gasifying a typical Western U.S.A. sub-bituminous coal using oxygen, $H_2O$ and pulverized coal in an entrained-bed type gasifier, which will produce hot gas containing principally CO, $H_2$, $CO_2$ and $H_2O$. The gasification temperature in such gasifier is generally about 1400° C. At this temperature the coal ash becomes liquid, is water quenched and removed from the bottom region of the gasifier as slag.

As a specific example of the present invention, and with reference to the drawing, coal, oxygen, and steam are reacted in a partial oxidation gasifier 50 and exit it at a temperature of 1350° C. and with a quality of 4.1. The gas contains $H_2S$ and COS from sulfur in the coal, some unreacted coal char and some ash carryover. The gas is tempered to 950° C. by by-passing a portion of the hot gas through water cooled cooler 64. Water is condensed from the by-passed gas which improves the quality of the by-passed gas to 7.1 and the tempered gas to 4.8. Any liquid droplets of ash in the 1350° C. gasifier gas condense when cooled to 950° C. The tempered gas is dedusted in cyclone 80 before passing into furnace 10. The hot reducing gas is distributed across the burden 21 in the furnace and then flows upwardly, counter to the descending burden.

The furnace burden is formed of a mixture of iron oxide pellets or natural lump ore, particulate carbonaceous material such as coke, and particulate limestone. The particle size is preferably in a range of about 5 to 30 mm for good permeability. The burden mixture is charged into hopper 12 of shaft furnace 10 and descends by gravity through the furnace. During its descent the burden is heated by the hot gases, iron oxide is reduced to iron, limestone is calcined to lime which reacts with sulfur in the reducing gas to form calcium sulfide, and carbon reacts with $CO_2$ and $H_2O$ in the reducing gas to form CO and $H_2$. The hot burden is cooled in the cooling zone of the furnace and discharged through furnace discharge pipe 22 to discharge conveyer 24. The furnace product consists of direct reduced iron, unreacted carbon, unreacted lime or limestone, and calcium sulfide. The direct reduced iron may be magnetically separated for use in electric arc furnaces or simply screened for use in blast furnaces.

The hot gas enters the burden through inlet ports 28 at a temperature of about 950° C. with a quality of 4.8 and is reacted with hot carbon according to the equations:

$$CO_2 + C = 2CO$$

and $$H_2O + C = CO + H_2$$

Because of the long residence times available in the shaft furnace, these endothermic reactions proceed and cool the gas to about 750° C. while upgrading the gas 30 within the burden to a quality of 8, which is suitable for efficient operation of the direct reduction furnace.

The hot gas entering the burden at 950° C. has a sulfur concentration of about 4100 ppmv for the particular coal selected for the sample cited. Sulfur is in the form of $H_2S$ and COS, both of which react with lime as follows:

$$H_2S + CaO = CaS + H_2O$$

and $$COS + CaO = CaS + CO_2$$

The combination of relatively low temperature (950° C.) and upgrading to lower oxidants ($CO_2$ plus $H_2O$) favor $H_2S$ and COS removal by lime. Laboratory experiments have shown that the sulfur components contained in the gas will preferentially react with lime in a burden containing lime and direct reduced iron. Therefore, low sulfur direct reduced iron is produced. The amount of limestone required will depend on the sulfur content of the coal. The amount of $CO_2$ plus $H_2O$ formed in the above desulfurizing reactions is only a small fraction of the total gas volume and has a minor effect on the quality of the reacted gas. The $CO_2$ released during calcining of the limestone to burned lime also has only a minor effect on gas quality. Both of these minor additions of $CO_2$ plus $H_2O$ are included in the tabulations hereinafter shown.

The following tables give a comprehensive process analysis of the invented process and are keyed to the drawing. These data are to be understood as being merely illustrative and in no way limiting. All of the tabulations are based on one metric ton of direct reduced iron produced, having a degree of metallization of 92 percent and a carbon content of 1.5 percent. These are widely accepted commercial standards for direct reduced iron made in natural gas based direct reduction plants.

Table I shows the gas flow rates and gas quality (reductant to oxidant ratio) at the locations indicated with reference to the drawing.

TABLE I

| Item | GAS FLOWS | | |
|---|---|---|---|
| | Reference Numeral | Flow In *Nm³ | Gas Quality |
| Gasifier Gas | 58 | 1941 | 4.1 |
| By-Pass Gas | 62 | 621 | 7.1 |
| Reducing Gas | 26 | 1884 | 4.8 |
| Upgraded Gas | 30 | 1992 | 8.0 |
| Spent Reducing Gas | 32 | 1996 | 1.5 |
| Cooled Top Gas Export Fuel | 36 | 1827 | 1.9 |

*Normal Cubic Meters

Table II shows the feed requirements for the coal gasifier 50.

TABLE II

| COAL GASIFIER | |
|---|---|
| Dry Coal (kg) | 965 |
| $H_2O$ (kg) | 263 |
| Oxygen (Nm³ of 98% $O_2$) | 483 |

Table III shows the feed requirements and the outputs of direct reduction shaft furnace 10.

TABLE III

| Direct Reduction Shaft (all units are kg) | |
|---|---|
| Limestone in | 69.3 |
| CaO out | 19.4 |
| CaS out | 25.0 |
| Upgrading carbon fed | 72.9 |
| Total carbon reacted | 58.3 |
| Unreacted carbon out | 14.6 |

Table IV shows the approximate energy requirements for the invented process.

TABLE IV

| ENERGY | |
|---|---|
| Gasifier | 6.1 Gcal |
| Upgrading Carbon Fed | 0.6 Gcal |
| Oxygen Plant Coal | *0.8 Gcal |
| Total | 7.5 Gcal |
| Cooled Top Gas Export Fuel | 3.6 Gcal |
| Consumed for reduction | 3.9 Gcal |

*Approximately 293 kWh at 30% conversion efficiency

Table V shows the gas temperatures at the indicated locations in the process.

TABLE V

| GAS TEMPERATURES | | |
|---|---|---|
| Item | Reference Numeral | Temperature Degrees C. |
| Out Gasifier | 58 | 1350 |
| Out By-Pass Cooler | 66 | 40 |
| To Direct Reduction Shaft | 82 | 950 |
| After Carbon Reaction | 30 (in shaft) | 750 |
| Out Direct Reduction Shaft | 32 | 660 |
| Export Fuel | 36 | 40 |

Table VI shows the gas analyses at the indicated locations in the process.

TABLE VI

| GAS ANALYSIS |
|---|
| Reference |

TABLE VI-continued

GAS ANALYSIS

| Item | Numeral | % CO | % CO$_2$ | % H$_2$ |
|---|---|---|---|---|
| Gasifier Gas | 56 | 50.0 | 7.8 | 29.2 |
| Out By-Pass Cooler | 66 | 54.6 | 8.5 | 31.9 |
| To Shaft | 82 | 51.5 | 8.0 | 30.1 |
| After Carbon Reaction | 30 | 54.4 | 7.4 | 33.7 |
| Out Reduction Shaft | 32 | 32.8 | 28.4 | 26.1 |
| Export Fuel* | 36 | 35.8 | 31.0 | 28.5 |

| Item | % H$_2$O | % CH$_4$ | % N$_2$ | ppmv (H$_2$S + COS) |
|---|---|---|---|---|
| Gasifier Gas | 11.7 | 0.1 | 0.8 | 4000 |
| Out By-Pass Cooler | 3.6 | 0.1 | 0.9 | 4400 |
| To Shaft | 9.0 | 0.1 | 0.8 | 4100 |
| After Carbon Reaction | 3.7 | 0.1 | 0.8 | |
| Out Reduction Shaft | 11.2 | 0.1 | 1.4 | |
| Export Fuel* | 3.0 | 0.1 | 1.6 | 0 |

*The heating value of export fuel is 208 Btu/scf or 1959 kcal/Nm$^3$ (HHV)

It can readily be seen from the foregoing that we have provided an energy efficient, useful and practical apparatus for achieving direct reduction of iron utilizing coal gasifier gas as the source of reductant, and for simultaneously producing a clean fuel gas for export from the facility.

We claim:

1. Apparatus for the direct reduction of iron oxide and production of fuel gas comprising:

(a) a solid fossil fuel gasifier for producing a hot gasifier gas;

(b) cooling means communicating with said gasifier for cooling a portion of said hot gasifier gas and tempering said gas, said cooling means comprising a hot gasifier gas conduit communicating with said gasifier, said conduit having therein a restrictive orifice for creating a resistance to gas flow therethrough, a gas by-pass conduit communicating with said hot gas conduit at a first by-pass junction on the upstream side of said orifice and a second by-pass junction on the downstream side of said orifice, said by-pass conduit having therein a hot gas cooler;

(c) a hot gas cyclone communicating with said cooling means for removing particulate material from said tempered gas and forming a clean tempered gas;

(d) a temperature monitoring device in said hot gas conduit downstream from said second by-pass junction, and a valve in said by-pass conduit downstream from said cooler, said valve being connected to and responsive to output signals from said temperature monitoring device;

(e) a continuous gravity flow shaft furnace containing a burden comprising iron oxide, solid fossil fuel and limestone, having burden feed means at its upper end and product removal means at its lower end, along with an intermediate tempered gas introducing means and spent gas removal means near its upper end above the burden stockline;

(f) a cooler scrubber communicating with said spent top gas removal means for forming clean cool fuel gas; and (g) a recycle gas conduit communicating with said top gas cooler scrubber and said hot gas conduit for recycling cleaned top gas to said shaft furnace.

2. Apparatus according to claim 1 wherein said fossil fuel is coal.

3. Apparatus according to claim 1 wherein said shaft furnace has a cooling zone immediately above its product removal means, said cooling zone comprising a closed cooling gas loop including a lower cooling gas inlet to said furnace and an upper cooling gas outlet from said furnace, said outlet communicating with the inlet to a cooler-scrubber, the outlet of which cooler-scrubber communicates with said cooling gas inlet to said furnace.

* * * * *